US009227726B2

(12) United States Patent
Boren

(10) Patent No.: US 9,227,726 B2
(45) Date of Patent: Jan. 5, 2016

(54) AIRCRAFT BIRD STRIKE PREVENTION

(71) Applicant: The Boeing Company, Chicago, IL (US)

(72) Inventor: Kelly L. Boren, Marysville, WA (US)

(73) Assignee: The Boeing Company, Chicago, IL (US)

( * ) Notice: Subject to any disclaimer, the term of this patent is extended or adjusted under 35 U.S.C. 154(b) by 163 days.

(21) Appl. No.: 13/689,743

(22) Filed: Nov. 29, 2012

(65) Prior Publication Data

US 2014/0145035 A1 May 29, 2014

(51) Int. Cl.
*B64D 1/18* (2006.01)
*A01M 29/12* (2011.01)
*B64D 45/00* (2006.01)
*B64D 1/16* (2006.01)

(52) U.S. Cl.
CPC ................. *B64D 1/18* (2013.01); *A01M 29/12* (2013.01); *B64D 1/16* (2013.01); *B64D 45/00* (2013.01); *B64D 2045/0095* (2013.01)

(58) Field of Classification Search
CPC .............. B64D 1/16; B64D 1/18; B64D 1/00; B64D 45/00; B64D 2045/0095; A01M 29/12
USPC ........................................... 244/136; 239/171
See application file for complete search history.

(56) References Cited

U.S. PATENT DOCUMENTS 1,278,170 A * 9/1918 Koltko ..................... B64D 1/16 239/171
1,619,183 A * 3/1927 Bradner .................... F14H 9/06 239/171
1,784,157 A * 12/1930 Oglesby .................. G09F 21/16 239/171
2,476,171 A * 7/1949 Williams, Jr. ............. F16K 3/18 239/129
2,537,251 A * 1/1951 Wilson ..................... B64D 1/16 239/171
3,190,590 A * 6/1965 Ripper et al. ................. 244/136
3,242,098 A * 3/1966 Andrews ....................... 422/305
4,204,645 A * 5/1980 Hopp ............................ 239/341
4,221,334 A * 9/1980 Christopher ............. A62C 2/08 239/112
4,328,940 A * 5/1982 Malcolm ....................... 244/136
RE30,993 E * 7/1982 Hopp ............................ 239/341
4,437,630 A * 3/1984 Jefferies ................... B64D 1/18 239/171
4,560,107 A * 12/1985 Inculet .................... B05B 5/043 239/171
4,948,050 A * 8/1990 Picot ............................ 239/171

(Continued)

FOREIGN PATENT DOCUMENTS

WO WO 2005123503 A1 * 12/2005 ............... B64D 1/18

OTHER PUBLICATIONS

Drs Foster & Smith, "Bird Safety: Bird Proof Your Home to Eliminate Household Hazards", peteducation.com. Archived on Nov. 26, 2010 by the Internet Archive. https://web.archive.org/web/20101126190537/http://peteducation.com/article.cfm?c=15+ 1912 &aid=3110. Accessed Jun. 17, 2015.*

(Continued)

*Primary Examiner* — Alexander V Giczy
(74) *Attorney, Agent, or Firm* — Hugh P. Gortler

(57) ABSTRACT

A method comprises continuously discharging a persistent vapor of bird repellant from a non-propulsion apparatus on a flying aircraft into an elevated airspace to substantially cover a runway flight path corridor at a commercial airport to prevent birds from striking subsequent aircraft in the corridor. The discharging automatically begins from a runway at the airport and automatically ends when the corridor is substantially covered.

16 Claims, 4 Drawing Sheets

(56) References Cited

U.S. PATENT DOCUMENTS

| | | | | |
|---|---|---|---|---|
| 5,248,086 | A * | 9/1993 | Waldrum | A01M 7/0014 239/1 |
| 6,626,375 | B1 * | 9/2003 | Ireland | B64D 1/18 169/53 |
| 6,799,740 | B2 * | 10/2004 | Heller | A01M 7/0089 239/171 |
| 6,871,796 | B2 * | 3/2005 | Jones | B64D 1/18 239/171 |
| 6,886,784 | B1 * | 5/2005 | Howe | 244/136 |
| 7,735,752 | B1 * | 6/2010 | Songer | B64D 1/18 239/163 |
| 8,279,109 | B1 | 10/2012 | Piesinger | |
| 2004/0035879 | A1 * | 2/2004 | Vergote | 222/3 |
| 2004/0037863 | A1 * | 2/2004 | Crawford | 424/405 |
| 2007/0018037 | A1 * | 1/2007 | Perlo et al. | 244/45 R |
| 2007/0145191 | A1 * | 6/2007 | Smith | B64D 1/18 244/136 |
| 2008/0210825 | A1 * | 9/2008 | Hale et al. | 244/136 |
| 2009/0118874 | A1 * | 5/2009 | White et al. | 701/3 |
| 2009/0261180 | A1 * | 10/2009 | Donoho et al. | 239/69 |
| 2009/0291109 | A9 * | 11/2009 | Crawford | 424/405 |
| 2010/0096471 | A1 * | 4/2010 | Djordjic | 239/67 |
| 2010/0230531 | A1 * | 9/2010 | Fayed et al. | 244/30 |
| 2012/0222611 | A1 | 9/2012 | Yifrach | |

OTHER PUBLICATIONS

Wikipedia, "Bird scarer" webpage. Archived by Internet Archive on Jan. 25, 2010, http://web.archive.org/web/20100125065401/http://en.wikipedia.org/wiki/Bird_scarer#Radio_controlled_aircraft, accessed Oct. 20, 2015.*

Umeda et al., "Evaluation of Methyl Anthranilate forUse as a Bird Repellent in Selected Crops" (2001), http://ag.arizona.edu/pubs/crops/az1252/.

"Bird Strike", Wikipedia, http://en.wikipedia.org/wiki/Bird_strike.

"About Methyl Anthranilate (MA)", http://www.flockfighters.com/products_MA.html.

* cited by examiner

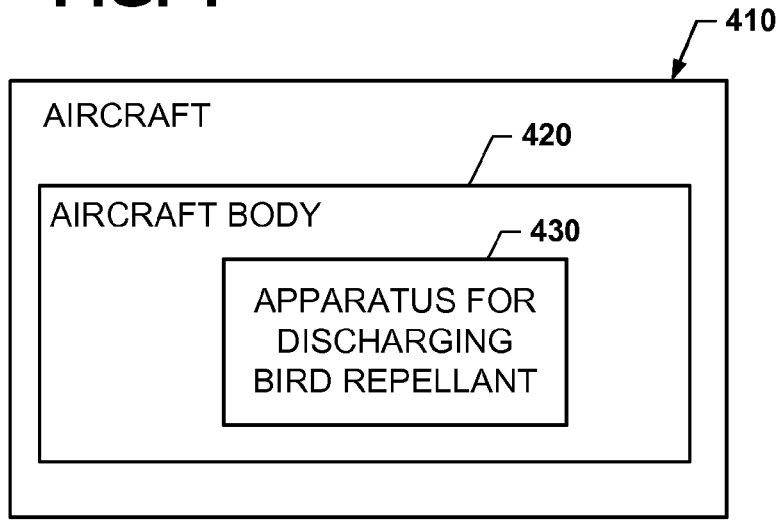
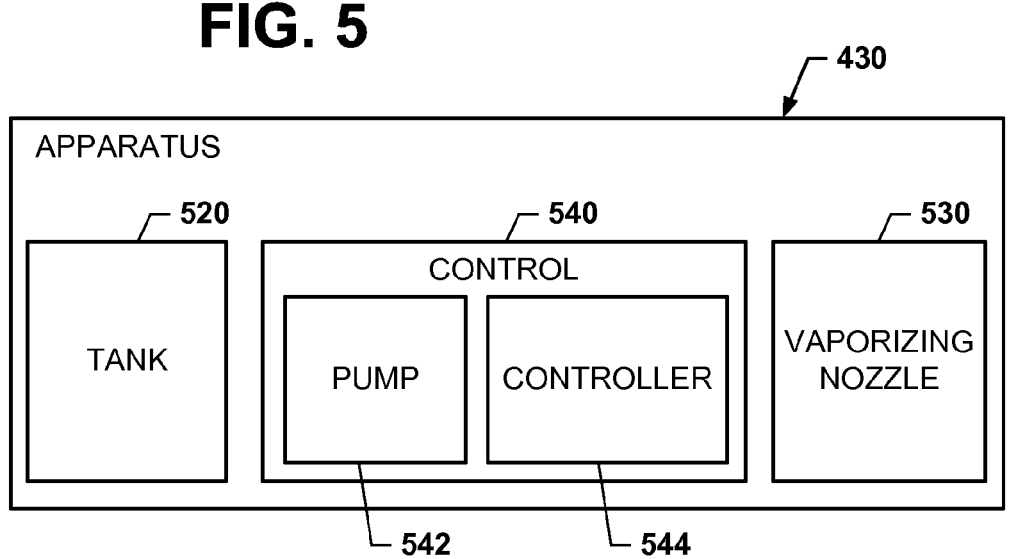

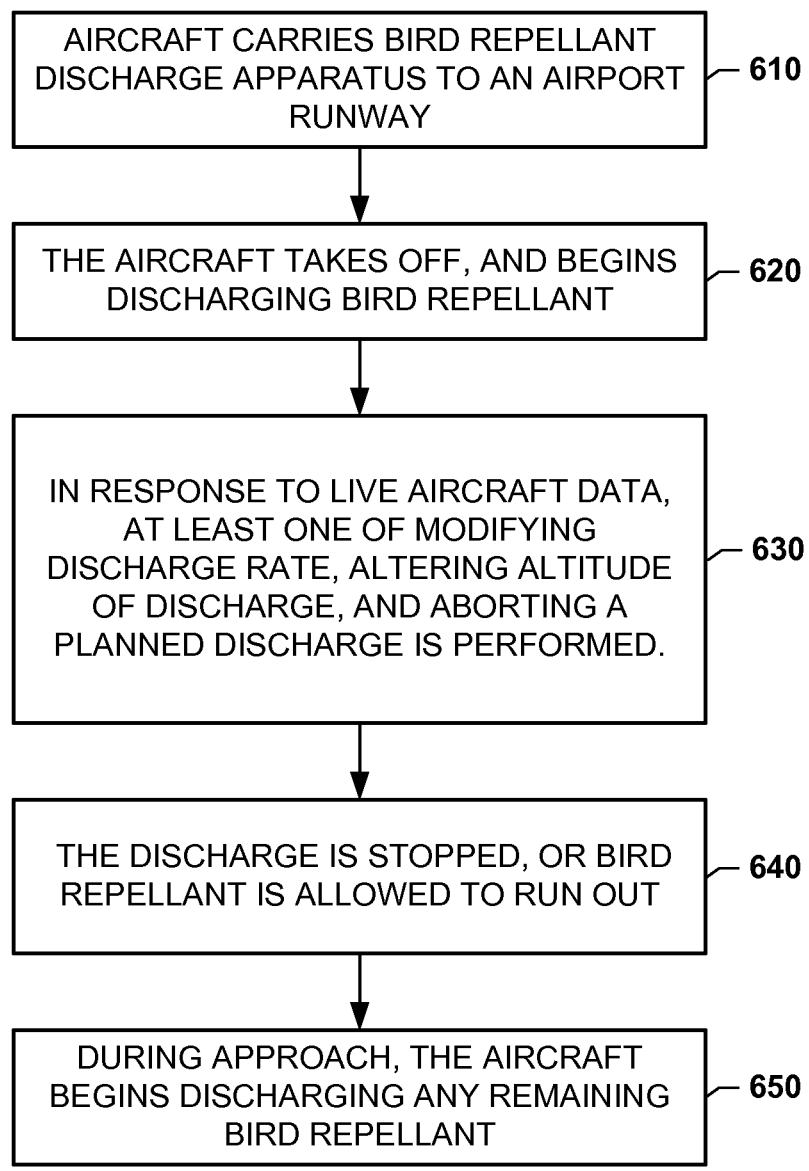

AIRCRAFT BIRD STRIKE PREVENTION

BACKGROUND

Bird strikes can cause damage to commercial aircraft. The resulting aircraft damage is costly to repair. Also, aircraft downtime during repair is costly as it results in lost revenues for aircraft operators. So, it is desirable to minimize bird strikes.

Some have suggested putting lights (flashing lights, for example) and/or noise makers on the aircraft themselves. Such expedients have proven ineffective.

Accordingly, a more effective way of keeping flying birds out of the flight path of aircraft at airports is needed.

SUMMARY

According to an embodiment herein, an aircraft comprises an aircraft body, and apparatus, carried by the body, for discharging a persistent vapor of bird repellant into an elevated airspace.

According to another embodiment herein, a method comprises discharging a persistent vapor of bird repellant from a flying aircraft into an elevated airspace to prevent birds from striking other aircraft in the elevated airspace.

According to another embodiment herein, an apparatus is configured to be carried upon an aircraft. The apparatus comprises a tank, a vaporizing nozzle, and control for causing bird repellant to be discharged from the tank via the nozzle. The control is configured to cause the bird repellant to be discharged into a selected elevated airspace above an airport runway.

These features and functions may be achieved independently in various embodiments or may be combined in other embodiments. Further details of the embodiments can be seen with reference to the following description and drawings.

BRIEF DESCRIPTION OF THE DRAWING FIGURES

FIG. 1 provides a diagrammatic representation of an airport with a runway, and of a landing approach flight path and a take off departure flight path to and from the runway, respectively.

FIG. 2 is an enlarged fragmentary view of a portion of FIG. 1, illustrating a method of protecting the airspace of the landing and take off flight paths by repelling birds from this airspace.

FIG. 3 provides a perspective view of an apparatus carried upon an aircraft for discharging into the airspace identified in FIGS. 1 and 2 a persistent vapor of a bird repellant which will repel flying birds.

FIG. 4 is an illustration of an aircraft including apparatus for discharging a persistent vapor of a bird repellant into a selected airspace.

FIG. 5 is an illustration of an example of an apparatus for discharging a persistent vapor of a bird repellant into an elevated airspace.

FIG. 6 is an illustration of a method of discharging a persistent vapor of a bird repellant into an elevated airspace.

DETAILED DESCRIPTION

Figure 1:
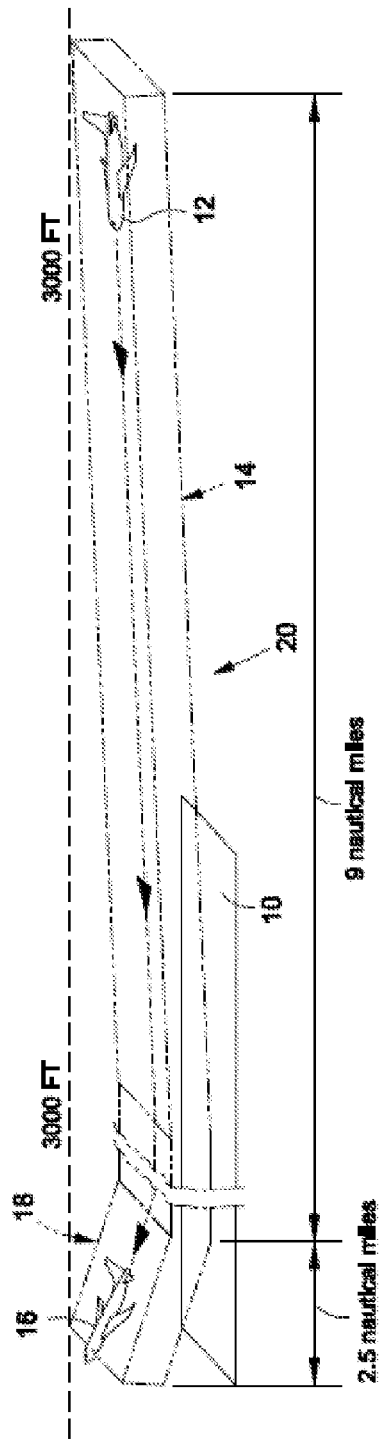

Recent bird strike studies have shown that over 90% of bird strikes occur at altitudes of less than 3000 feet, and within 9 miles of an airport runway for aircraft approaching landing, or within 2.5 miles of the airport runway following takeoff for an aircraft departing an airport. By far, the majority of bird strikes occur during approach to a landing, almost always during daylight hours, and during the summer and fall months (i.e., July through October). Both for aircraft approaching landing, and for those departing an airport, the elevated airspace (or flight path) to be occupied by the aircraft and to be kept free of flying birds is generally aligned with an airport runway, and extends to an elevation of about 3000 feet (sloping downwardly toward landing and sloping more steeply upwardly following takeoff), and extends generally less than a mile laterally of the runway alignment. This relatively thin flight path corridor at an airport runway (hereinafter the "runway flight path corridor") is the airspace from which birds should be excluded if bird strikes are to be reduced or eliminated.

In view of the above, methyl anthranilate ("MA") or another bird repellant may be used to protect flying aircraft from flying bird strikes within the runway flight path corridor. By discharging MA or another bird repellant into the runway flight path corridor in a vapor form that does not sink and remains persistently in the air, birds will be repelled and bird strikes against aircraft approaching and departing a runway will be significantly reduced or eliminated.

Reference is made to FIG. 4, which illustrates an aircraft 410 for discharging bird repellant into a runway flight path corridor. The aircraft 410 may be manned (for example, a general aviation aircraft, a helicopter, or a commercial passenger or freight aircraft) or unmanned (for example, a remotely piloted vehicle, or "RPV" or an unmanned autonomous vehicle or "UAV"). The aircraft 410 includes a body 420 and an apparatus 430, carried by the body 420, for discharging a persistent vapor of bird repellant into a runway flight path corridor. For a commercial aircraft, major components of the body 420 may include a fuselage, wing assemblies and empennage. The apparatus 430 may be carried by any of these major components. For an unmanned aircraft, the apparatus 430 may be stored, for example, in a payload bay.

The aircraft 410 discharging the bird repellant does not protect itself against bird strikes in the runway flight path corridor. Rather, it discharges the bird repellant into the runway flight path corridor so subsequent aircraft entering the runway flight path corridor are protected. Moreover, the aircraft 410 does not necessarily discharge the bird repellant directly into the runway flight path corridor. The aircraft 410 may discharge the bird repellant into a selected elevated airspace such that the bird repellant enters into the runway flight path corridor. For instance, the bird repellant may be discharged upwind of the runway flight path corridor and blown from the selected elevated airspace into the runway flight path corridor.

The aircraft 410 discharging bird repellant into the selected airspace may be flown along the approach flight path(s) to an airport, and along the departure flight path(s) from an airport, either within these paths, or upwind of these flight paths, most desirably during daylight hours and during the months of the year when bird strikes are most common. In commercial aircraft, for example, the apparatus 430 may be configured to be easily installed onto and removable from an aircraft 410.

FIG. 1 provides a diagrammatic view of an airport with a runway 10 to which a commercial aircraft 12 approaches along a landing corridor 14, and from which aircraft 16 departs along a take off corridor 18. The corridors 14 and 18 have a thickness in the vertical direction of but a few hundred feet, and extend laterally of the alignment of the runway 10 by a mile or less within the relevant altitude and distance from the runway 10. That is, as discussed above, the majority of bird strikes occur at elevations of 3000 feet or less. So, it is in the elevations from 3000 ft. above runway 10, down to the runway 10, and within the flight path corridors 14, 18 that birds are to be repelled in order to prevent flying bird strikes by aircraft. FIG. 1 well illustrates the airspace (generally indicated with numeral 20, and including landing corridor 14 and take off corridor 18) from which it is desired to repel flying birds in order to make this airspace safer for the transit of aircraft using these flight paths to and from the runway 10.

Figure 2:
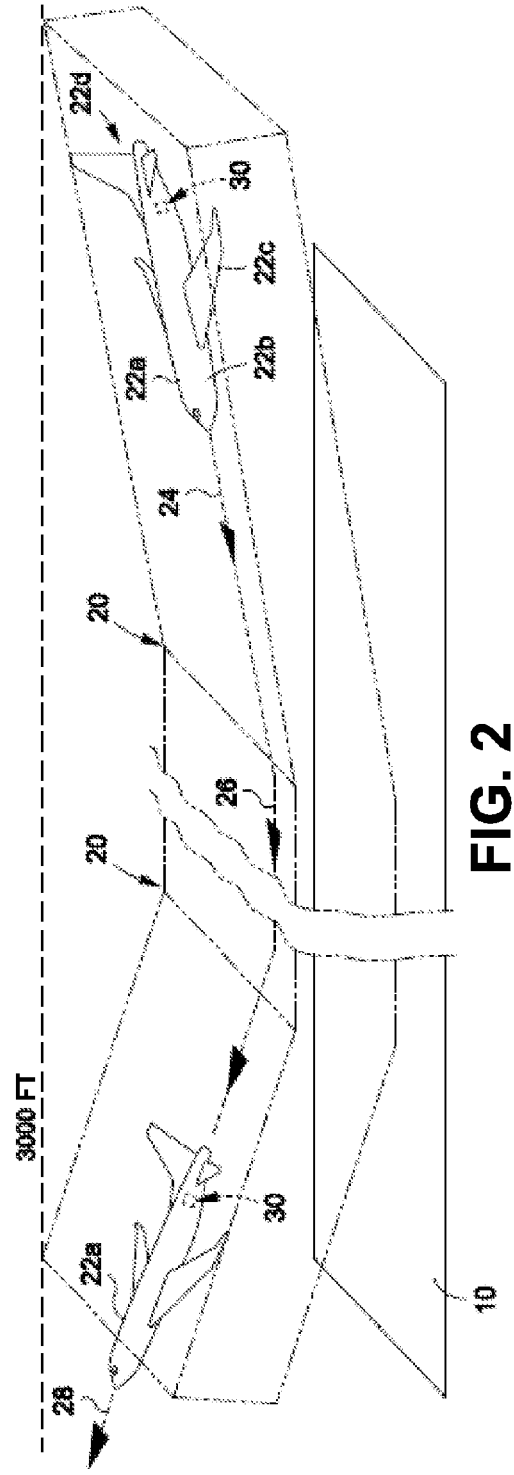

FIG. 2 depicts a portion of the airspace 20 at an enlarged size so that it is seen that a commercial aircraft 22 flies along paths as are generally indicated by the arrows 24, 26, and 28. Arrow 24 depicts the aircraft 22 flying relative to (possibly within) the approach or landing corridor 14. That is, it is to be noted that the aircraft 22 may actually fly within the corridor 14, or may fly upwind of but generally parallel to and at elevations corresponding generally with the corridor 14, depending on wind conditions at a particular time. It is to be noted that the length of the runway 10 has been foreshortened in both of FIGS. 1 and 2. Arrow 26 depicts the aircraft 22 transitioning along the length of the runway 10 (generally parallel to but not necessarily over runway 10) from landing corridor 14 to take off corridor 18. Arrow 28 similarly depicts aircraft 22 flying relative to (possibly within) the take off corridor 18. During flight the aircraft 22 discharges, from an apparatus generally indicated with dashed line box 30 on FIG. 2, a persistent bird repellant into a selected one or both of the landing corridor 14 and take off corridor 18.

In FIG. 2, an apparatus 30 for discharging a persistent vapor bird repellant is depicted by a dashed-line box. FIG. 2 shows the apparatus 30 aboard the empennage 22d of the aircraft 22. In some embodiments, the apparatus 30 may be located in an auxiliary power unit (APU) bay in the empennage 22d. However, the location of the apparatus 30 is not limited to the empennage 22d. In other embodiments, the apparatus 30 may be located in or near a fuselage 22a, landing gear bay 22b, or in a wing-to-body fairing 22c of the aircraft 22.

Figure 3:
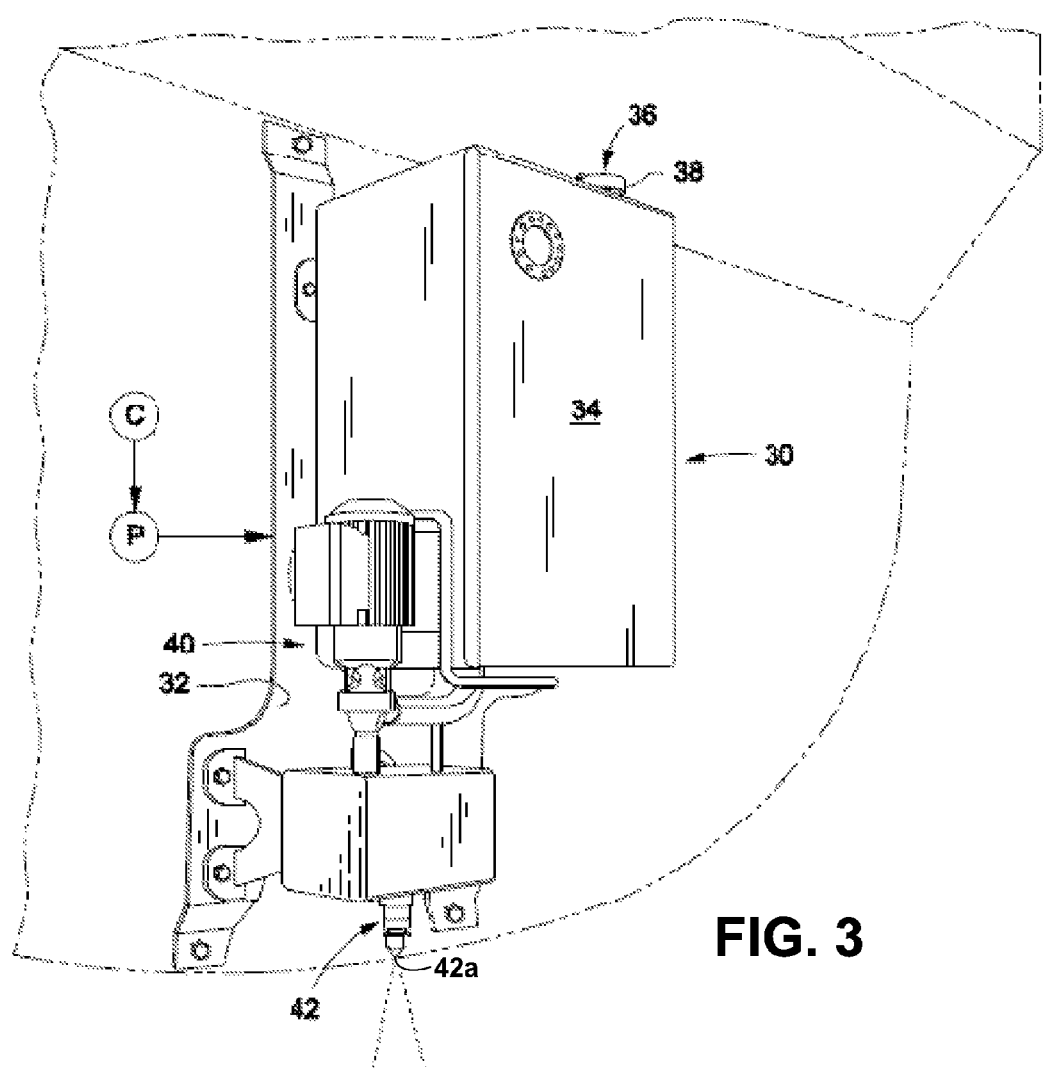

FIG. 3 illustrates one embodiment of an apparatus 30 for discharging a persistent vapor bird repellant from aircraft 22 and into the airspace 20. The apparatus 30 may include a base or panel 32, which is adapted for quick installation into and removal from the aircraft 22. That is, the apparatus 30 when carried aboard a general aviation aircraft, aboard a helicopter, or even aboard a commercial passenger or freight aircraft, may be installed within the aircraft during the months of the year when bird strikes are most common, and is preferably removed for the remainder of the year. The apparatus 30 may receive power for its operation (electrical power, for example—indicated with the character "P" on FIG. 3) as well as control signals ("on" and "off" signals, for example— indicated on FIG. 3 with the character "C") from the aircraft 22 upon which it is carried.

Mounted upon the panel 32 is a tank 34 having an inlet 36 for receiving MA or another liquid bird repellant. The inlet 36 is closed by a cap 38. A pump 40 also mounted to the panel 32 receives bird repellant from tank 34 and during operation of the pump 40 delivers the liquid bird repellant pressurized to an atomizing or vaporizing nozzle 42. The nozzle 42 preferably extends at least slightly outwardly of the aircraft carrying the apparatus 30 and into the surrounding air stream so, during flight, it can discharge atomized bird repellant in the form of a persistent vapor. For instance, the nozzle 42 may extend through a hole in an APU access door.

This vapor of atomized persistent bird repellant is delivered through an orifice (generally indicated at 42a) in the nozzle 42. Particle size of the vapor may be set according to the size of the orifice 42a. Particle size of the vapor may be about 30 microns or less. For example, the atomized vapor of bird repellent has a vapor particle size of from about 5 microns to about 25 microns. Such a small particle size provides a vapor that is essentially "dry" and leaves no wet residue, and which is very persistent within the runway flight path corridor. That is, this small particle size allows the persistent vapor of bird repellent to remain suspended in the runway flight path corridor, so that the bird repellent does not sink to the ground. Accordingly, as the persistent vapor of bird repellent disperses into the runway flight path corridor, flying birds are repelled from the runway flight path corridor, and subsequent aircraft can more safely transit this airspace to and from the airport and runway 10.

The base panel 32 may include a heating element with temperature sensing to maintain the repellent in a liquid state for dispersal into the selected elevated airspace on approach for landing. Even during summer, the APU bay for example would be cold at altitude as the APU is not generally used in flight. Repellent carried in flight but reserved for dispersal on landing would be heated in order to prevent freezing.

Reference is now made to FIG. 5, which illustrates an example of an apparatus 430 for the aircraft 410. The apparatus 430 includes a tank 520, vaporizing nozzle 530, and control 540 for causing bird repellant to be discharged from the tank 520 via the nozzle 530. In some embodiments of the apparatus 430, the nozzle 530 delivers particles of fixed size (for instance, by using a fixed orifice size). In other embodiments, the particle size may be varied. As a first example, a single nozzle 530 having a variable orifice may be used. As a second example, the apparatus 510 includes at least one additional nozzle (not shown), where the different nozzles have different orifice sizes. The nozzle discharging a desired particle size is selected.

The control 540 may include a pump 542, which receives electrical power from the aircraft 410 and pumps repellant from the tank 520 to the nozzle 530. Other embodiments, however, may eliminate the pump and use other means to discharge the bird repellant (e.g., an airflow assisted gravity feed system).

The control 540 may further include a controller 544 for controlling the pump 542. The controller 544 may be analog or digital. Although located onboard the aircraft 410, the controller 544 is preferably not integrated electronically with other onboard systems (to avoid full failure could affect the other onboard systems).

In some embodiments, the controller 544 may include a simple on-off switch operated manually by the crew of the aircraft or automatically by aircraft avionics. In other embodiments, the control 540 may include a "weight-on-wheels" sensor, such that the repellant is not discharged while the aircraft is on the ground with weight on its landing gear. Once the sensor senses that the aircraft is off the ground, the controller 544 causes the pump 542 to start pumping bird repellant to the vaporizing nozzle 530.

In still other embodiments, the controller 544 may include a digital processor that is programmed to control the operation of the pump 542. For example, the digital processor may be programmed to control the pump 542 to discharge the bird repellant at a rate that follows a predetermined profile or a profile determined by real time data collection. The digital processor may also be programmed to make a "go" or "no go" decision to discharge based on a state table in response to real time data collected by onboard sensing systems and advanced radar systems, and also in response to inputs from pilots, air traffic control, and ground service spotters (e.g., spotters with visual "eyes on birds" reports).

In some embodiments, the controller 544 may also control the size of the particle discharged through the nozzle. As a first example, the controller 544 may control orifice size of a nozzle having a variable orifice. As a second example, the controller 544 may select a nozzle among a plurality of nozzles having different orifice sizes.

In some embodiments, the digital processor may be programmed to communicate with multiple on board sensing and information systems allowing the apparatus 430 to combine information regarding weather conditions (e.g., high winds, heavy precipitation, temperature) and more detailed information such as bird sighting and bird strike reports, advanced onboard radar systems reports, general air traffic congestion, pilot inputs, etc. The digital processor may use this information to modify dispersal rates, alter altitude of dispersal, or abort a planned dispersal.

Reference is now made to FIG. 6, which illustrates a method of using the apparatus with digital controller to discharge bird repellant into a selected elevated airspace. At block 610, an aircraft carries the apparatus to an airport runway. At block 620, the aircraft takes off, and begins discharging the bird repellant under control of the digital controller. At block 630, in response to live aircraft data, the digital controller performs at least one of modifying discharge rate, altering altitude of discharge, and aborting a planned discharge. At block 640, the digital controller either stops the discharge or allows the tank to run out of bird repellant.

In some embodiments, the digital controller leaves an amount of bird repellant in the tank for use during approach and landing. At block 650, during approach of the aircraft, the digital controller causes the bird repellant to be discharged into the elevated airspace.

The bird repellant clears the runway flight path corridor of birds. As a result, subsequent aircraft entering the runway flight path corridor are protected against bird strike.

An apparatus herein may be refilled with bird repellant and used during each flight. However, use of an apparatus herein is not so limited. An apparatus herein may be used only when needed. For example, bird repellant is discharged according to a schedule of every tenth departure, when only a few birds are known to be in the area. Later, bird repellant is discharged on every other departure, but only for afternoon flights.

An apparatus herein is not limited to discharging bird repellant into the selected elevated airspace. For instance, if birds are sighted on the ground, an apparatus herein may discharge bird repellant on taxi. A wetter vapor that sinks to the ground may be desired for such discharge. In the case of a single nozzle having a variable orifice, orifice size may be increased to obtain a wetter vapor. In the case of multiple nozzles with different orifice sizes, the nozzle with a suitable orifice may be selected to obtain a wetter vapor.

An apparatus herein is not limited to commercial airports. An apparatus herein may be used, for example, in regional airports and military bases.

The invention claimed is:

1. An aircraft comprising:
an aircraft body; and
a non-propulsion apparatus carried by the aircraft body, the apparatus including a tank, a vaporizing nozzle, and a means for automatically causing bird repellant in the tank to be delivered to the nozzle and continuously discharged through the nozzle as the aircraft takes off from a runway and flies to an elevation substantially above the runway, wherein the discharging begins automatically upon takeoff from the runway and automatically stops at the elevation of about 3000 feet above the runway.

2. The aircraft of claim 1, wherein said vaporizing nozzle is configured to deliver a persistent vapor of bird repellant having a particle size of 30 microns or less.

3. The aircraft of claim 1, wherein said tank is filled with a liquid bird repellant including methyl anthranilate.

4. The aircraft of claim 1, wherein the aircraft body includes an empennage; wherein the means includes a pump for delivering the bird repellant from the tank to the vaporizing nozzle; and wherein said tank and said pump are mounted within said empennage as a self-contained unit.

5. The aircraft of claim 4, wherein said apparatus further includes a removable base panel upon which the tank and the pump are mounted.

6. The aircraft of claim 1 wherein the means causes a vapor of the bird repellant to be discharged into a runway flight path corridor adjacent the runway.

7. The aircraft of claim 1 wherein the means includes a pump, a weight-on-wheels sensor, and a digital processor programmed with instructions that, when executed, respond to a signal from the weight-on-wheels sensor by controlling operation of the pump to deliver the bird repellant in the tank to the nozzle.

8. The aircraft of claim 1, wherein the means includes a pump and a digital processor programmed with instructions that, when executed, cause the pump to operate according to live aircraft data.

9. A method comprising continuously discharging a persistent vapor of bird repellant from a non-propulsion apparatus on a flying aircraft into an elevated airspace to substantially cover a runway flight path corridor at a commercial airport to prevent birds from striking subsequent aircraft in the corridor, wherein the discharging automatically begins at takeoff from a runway at the airport and automatically ends when the corridor is substantially covered.

10. The method of claim 9, wherein the vapor of bird repellant is continuously discharged to an elevation of substantially 3000 feet above the runway.

11. The method of claim 9, wherein the vapor of bird repellant is discharged by the non-propulsion apparatus aboard an unmanned aircraft.

12. The method of claim 9, wherein the vapor of bird repellant is discharged by the non-propulsion apparatus aboard a commercial aircraft.

13. A non-propulsion apparatus configured to be carried upon an aircraft, said apparatus comprising a tank, a pump, a vaporizing nozzle, a digital processor programmed with instructions that, when executed, cause the pump to automatically and continuously deliver bird repellant from the tank to the nozzle and into a runway flight path corridor, and a weight-on-wheels sensor for generating a control signal indicative of takeoff, wherein the digital processor causes the pump to automatically start delivering the bird repellant in response to the control signal.

14. The apparatus of claim 13, wherein the digital processor is programmed with additional instructions that, when executed, cause the processor to receive live aircraft data and perform at least one of modifying discharge rates, altering altitude of discharge, and aborting a planned discharge.

15. The apparatus of claim 13, wherein the nozzle includes an orifice having a variable size; and wherein the processor is programmed with additional instructions that, when executed, causes the processor to control the nozzle to vary particle size of the discharged bird repellant.

16. The apparatus of claim 13, further comprising a removable base panel, wherein the pump and the tank are mounted to the base panel as a self-contained unit.

* * * * *